(12) United States Patent
Onishi

(10) Patent No.: US 7,519,094 B2
(45) Date of Patent: Apr. 14, 2009

(54) OPTICAL DISK DEVICE

(75) Inventor: Kazuaki Onishi, Daito (JP)

(73) Assignee: FUNAI Electric Co., Ltd., Osaka (JP)

( * ) Notice: Subject to any disclaimer, the term of this patent is extended or adjusted under 35 U.S.C. 154(b) by 345 days.

(21) Appl. No.: 11/528,278

(22) Filed: Sep. 28, 2006

(65) Prior Publication Data

US 2007/0077041 A1 Apr. 5, 2007

(30) Foreign Application Priority Data

Sep. 30, 2005 (JP) ............................ 2005-288785

(51) Int. Cl.
*H01S 3/00* (2006.01)
(52) U.S. Cl. .................................................. 372/38.04
(58) Field of Classification Search ............. 372/38.07, 372/29.02, 38.04; 710/14; 369/59.17
See application file for complete search history.

(56) References Cited

U.S. PATENT DOCUMENTS 5,742,579 A * 4/1998 Kazuno et al. ......... 369/124.07

FOREIGN PATENT DOCUMENTS

| JP | 2-84923 | 7/1990 |
|---|---|---|
| JP | 07-182056 | 7/1995 |
| JP | 08-051772 | 2/1996 |
| JP | 9247936 | 9/1997 |
| JP | 09-311655 | 12/1997 |
| JP | 11-122920 | 4/1999 |
| JP | 3089967 U | 8/2002 |
| JP | 2005-008079 U | 11/2005 |

* cited by examiner

*Primary Examiner*—Shawn Riley
(74) *Attorney, Agent, or Firm*—Pillsbury Winthrop Shaw Pittman LLP

(57) ABSTRACT

A power supply unit includes a transformer, and outputs a first power supply voltage which is used for logic processing and a second power supply voltage which is used for driving a drive unit. A voltage control unit includes a shunt regulator to a detection voltage input terminal of which is connected a voltage which has been voltage divided from the first power supply voltage, and controls the second power supply voltage to a predetermined voltage value. And a voltage application control unit applies a voltage which is determined in advance to the detection voltage input terminal of the shunt regulator, when the replay unit is in a stopped mode where replay by the replay unit of data recorded upon the optical disk is stopped.

4 Claims, 3 Drawing Sheets

OPTICAL DISK DEVICE

CROSS REFERENCE

This Nonprovisional application claims priority under 35 U.S.C. § 119 (a) on Patent Application No. 2005-288785 filed in Japan on Sep. 30, 2005, the entire contents of which are hereby incorporated by reference.

BACKGROUND OF THE INVENTION

The present invention relates to an optical disk device which reads and replays data recorded upon an optical disk such as a DVD or the like.

Optical disk devices which record data upon recording media are per se generally known and popular. Such an optical disk device irradiates laser light upon the recording surface of the optical disk, and reads the data which is recorded upon this optical disk by detecting the reflected light. During replay, the optical disk device performs various types of servo control. Types of such servo control are rotational speed control of the optical disk (rotational speed control of a spindle motor), control of the condensation upon the recording surface of the optical disk of the laser light irradiated upon this optical disk (focus control), control of the irradiation of the laser light irradiated upon this optical disk upon the center of the track from which data is being read (tracking control), and the like. In such servo control, drive units such as the spindle motor, a thread motor, an actuator which supports an objective lens of a pickup head, and the like are driven. On the other hand, in a stopped mode in which replay of the data which is recorded upon the optical disk is stopped, these drive units are not driven. Due to this, the load upon the power supply which supplies operating power to the drive units is different in a replay mode in which data which is recorded upon the optical disk is being replayed, and in the stopped mode. Thus, if the output of the power supply which supplies operating power to the drive units is the same in the replay mode and in the stopped mode, then the circuit components which are connected to the output side of this power supply will generate heat in the stopped mode.

Furthermore, power supplies which vary their outputs in response to fluctuation of the load are described in Japanese Laid-Open Patent Publication H07-182056, Japanese Laid-Open Patent Publication H08-51772, and Japanese Laid-Open Patent Publication H09-311655.

However, a typical optical disk device is built so as to obtain a first power supply voltage which is used in logic processing and a second power supply voltage which is used for driving the above described drive units from an AC-DC power supply which employs a transformer. The first power supply voltage is taken off from an intermediate point of a coil of a transformer from which the second power supply voltage is taken off. The optical disk device employs a shunt regulator in order to control the second power supply voltage to a predetermined voltage. In concrete terms, a voltage obtained by voltage dividing the first power supply voltage is connected to a detection voltage input terminal of the shunt regulator, and the second power supply voltage is controlled to a predetermined voltage by this shunt regulator.

On the other hand, the load imposed by logic processing is the same in the replay mode and in the stopped mode. The load upon the first power supply voltage is approximately the same in the replay mode and in the stopped mode. With a prior art type optical disk device, there has been no structure for changing over the voltage which is inputted to the detection voltage input terminal of the shunt regulator in the replay mode and in the stopped mode. As a result, it has not been possible to change the second power supply voltage which is used for driving the drive units according to fluctuations of the load in the replay mode and in the stopped mode. Due to this, with a prior art optical disk device, in order to prevent generation of heat by the circuit components which are connected in the output line of this second power supply voltage, high priced circuit components of high rating with respect to generation of heat have been used, so that there has been a problem of high cost.

A feature of the present invention is to provide an optical disk device, with which, along with preventing generation of heat by the circuit components in the stopped mode, also a reduction in cost may be anticipated.

SUMMARY OF THE INVENTION

With the present invention, a power supply unit uses a transformer, which outputs a first power supply voltage which is used for logic processing and a second power supply voltage which is used for driving a drive unit. A voltage control unit uses a shunt regulator, to a detection voltage input terminal of which is connected a voltage which has been voltage divided from the first power supply voltage, and controls the second power supply voltage to a predetermined voltage value. And a voltage application control unit applies a voltage which is determined in advance to the detection voltage input terminal of the shunt regulator, when a replay unit is in the stopped mode where replay by the replay unit of data recorded upon the optical disk is stopped.

In a replay mode, just the voltage which has been voltage divided from the first power supply voltage is inputted to the detection voltage input terminal of the shunt regulator; while, in the stopped mode, both the voltage which has been voltage divided from the first power supply voltage, and also the voltage produced by the voltage application control unit, are both thus inputted. Accordingly, in the stopped mode, it is possible to reduce the second power supply voltage below its level in the replay mode, so that it is possible to suppress the generation of heat in the various circuit components in the stopped mode, even though circuit components of high cost and which are highly rated from the point of view of heat generation are not employed.

And, in consideration of the fact that a time period of around a few seconds (1 to 2 seconds) is required from the start of processing for changing over from the replay mode to the stopped mode, until the drive unit stops, it would also be acceptable to arrange for the voltage application control unit to apply the voltage which is determined in advance to the detection voltage input terminal of the shunt regulator, after having waited until this time period has elapsed.

Furthermore, it would also be acceptable to arrange for the voltage application control unit immediately to stop applying the voltage which is determined in advance to the detection voltage input terminal of the shunt regulator, when a command has been issued for changeover from the stopped mode to the replay mode. By doing this, the transition from the stopped mode to the replay mode can be performed rapidly.

Moreover, the voltage application control unit may be included in a microcomputer which controls the operation of various sections of the main part of this optical disk device. By doing this, the application of the voltage which is determined in advance to the detection voltage of the shunt regulator, and the stoppage of this application, can be performed in software.

DETAILED DESCRIPTION OF THE INVENTION

Figure 1:
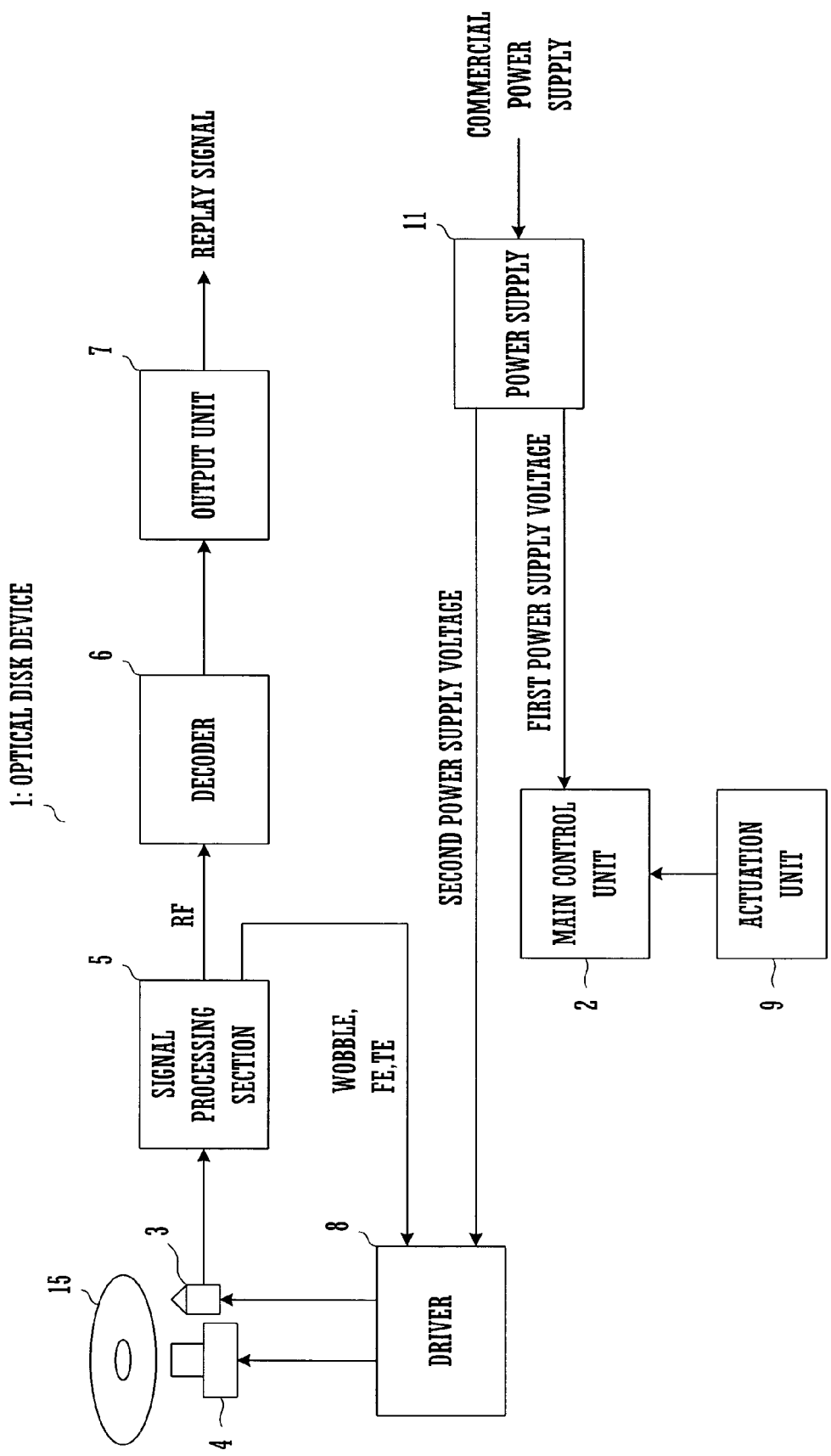
FIG. 1 is a block diagram showing the structure of the main portion of an optical disk device which is an embodiment of the present invention.

FIG. 1 is a block diagram showing the structure of the main portion of an optical disk device which is an embodiment of the present invention. The optical disk device 1 of this embodiment is a device which replays contents such as a program recorded upon an optical disk 15 such as a DVD or the like. The optical disk device 1 of this embodiment comprises a main control unit 2 which controls the operation of the various sections thereof. Furthermore, the optical disk device 1 comprises a pickup head 3 (hereinafter termed the PU 3), a spindle motor 4, a signal processing section 5, a decoder 6, an output unit 7, a driver 8, an actuation unit 9, and a power supply 11. The PU 3 irradiates laser light upon the optical disk 15 and detects and outputs the amount of reflected light. The spindle motor 4 rotates the optical disk 15. The signal processing section 5 processes the output signal of the PU 3 and generates a read signal (a RF signal) for the data which is recorded upon the optical disk 15, a wobble signal (the rotational speed of the spindle motor 4) which indicates the rotational speed of the optical disk 15, a focus error signal (a FE signal) which indicates the focus deviation, a tracking error signal (a TE signal) which indicates the tracking deviation, and the like. The decoder 6 processes the RF signal generated by the signal processing section 5, and extracts the data recorded upon the optical disk 15 and decodes this data. The output unit 7 generates and outputs a replay signal based upon the data decoded by the decoder 6. The driver 8 drives drive units, based upon the wobble signal, the FE signal, the TE signal and the like which are generated by the signal processing section 5. The actuation unit 9 receives input operation by the user. And the power supply 11 supplies operating power to the various sections described above.

The main control unit 2 perform so called logic processing for this invention. The PU 3 comprises a light emitting element (LD) which irradiates laser light upon the optical disk 15, an objective lens which condenses the laser light emitted from the LD, and a light receiving element (PD) which detects the light reflected from the optical disk 15. The objective lens of the PU 3 is mounted upon an actuator, and is driven by this actuator in the direction towards and away from the optical disk 15 (the focus direction) and in the radial direction of the optical disk 15 (the tracking direction). Furthermore, the PU 3 is mounted so as to be freely shiftable along a shaft which extends in the radial direction of the optical disk 15. The PU 3 is driven in the radial direction of the optical disk along this shaft by a thread motor not shown in the figures. The actuator upon which the objective lens of the PU 3 is mounted, the thread motor, the spindle motor 4, and so on correspond to the "drive unit" of the Claims.

The signal detected by the PD of the PU 3 is inputted to the signal processing section 5. The PD of the PU 3 is a light receiving element whose light receiving region is divided into two sections in the vertical direction and into four sections in the horizontal direction. The reflected light amounts detected by each of these light receiving regions of the PD are inputted to the signal processing section 5. The signal processing section 5 generates the RF signal, the FE signal, the TE signal, the wobble signal, and so on from these reflected light amounts detected by the light receiving regions of the PD. The RF signal is a read signal for the data which is recorded upon the optical disk 15. The FE signal is a signal which indicates the amount of deviation between the recording surface of the optical disk 15 and the position of condensation of the laser light which is irradiated upon this optical disk 15. The TE signal is a signal which indicates the amount of deviation between the center of the track which is formed upon the optical disk 15 and the position of irradiation of the laser light which is irradiated upon this optical disk 15. And the wobble signal is a signal which indicates the rotational speed at which the optical disk 15 is rotated by the spindle motor 4.

The RF signal which has been generated by the signal processing section 5 is inputted to the decoder 6. The decoder 6 processes this RF signal which is inputted, and, along with extracting the data recorded upon the optical disk 15, also decodes this extracted data. The data which is recorded upon the optical disk 15 is encoded according to MPEG or the like. The output unit 7 creates and outputs a replay signal (a replay video signal and a replay audio signal) based upon the data which has been decoded by the decoder 6. A display device (not shown in the figure) to which the replay video signal is inputted, and a speaker (also not shown in the figure) to which the replay audio signal is inputted, are connected to the output unit 7.

Furthermore, the FE signal, the TE signal, the wobble signal, and so on generated by the signal processing section 5 are inputted to the driver 8. The driver 8 controls the driving of the objective lens of the PU 3 in the focus direction based upon the FE signal which is inputted, controls the driving of the objective lens of the PU 3 in the tracking direction based upon the TE signal which is inputted, and controls the rotational speed at which the optical disk 15 is rotated by the spindle motor 4 based upon the wobble signal which is inputted. Supply of electrical power to the driver 8 for driving these drive units is performed from the power supply 11 (in the Claims, this is the supply of electric power at the second power supply voltage). The actuation unit 9 comprises a plurality of control keys upon which input actuation is performed by the user, and a remote control reception unit which receives control codes transmitted from a remote control device not shown in the figures. The user performs input for starting or for stopping replay of the optical disk 15 by actuating the actuation unit 9, or by actuating control keys which are provided upon the remote control device not shown in the figures.

Figure 2:
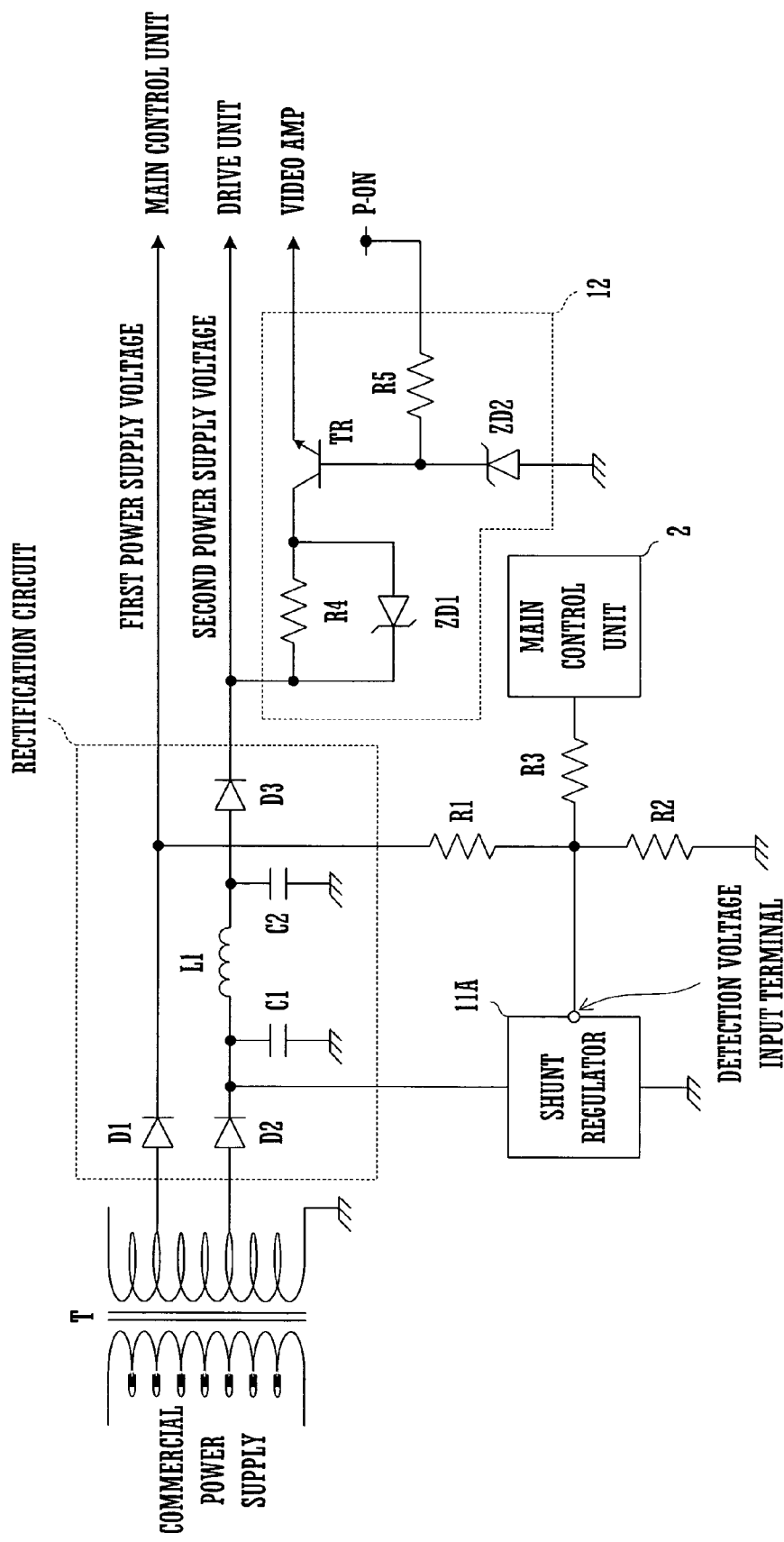
FIG. 2 is a figure showing the structure of a power supply of this optical disk device which is an embodiment of the present invention.

Next, the power supply 11 will be explained. As shown in FIG. 2, this power supply 11 is a power supply circuit in which a transformed T is employed. The commercial power supply is connected to the primary side of this transformer T. Furthermore, as shown in the figures, a rectification circuit is provided to the secondary side of the transformer T, in order to output a first power supply voltage for logic processing and a second power supply voltage for driving the drive units. The output line for the first power supply voltage is a supply line which supplies power to the main control unit 2 and so on for its logic processing. Furthermore, the output line for the second power supply voltage is a supply line which supplies power for driving the various drive units, such as the spindle motor, the actuator, the thread motor, and so on.

Furthermore, the power supply 11 is provided with a shunt regulator 11A for keeping the second power supply voltage constant. In the power supply 11, along with a voltage which is produced by voltage dividing the first power supply voltage outputted at the secondary side of the transformer T by resistors R1 and R2 being inputted to a detection voltage input terminal of this shunt regulator 11A, also a voltage outputted from an output terminal of the main control unit 2 is inputted to this detection voltage input terminal via a resistor R3. The input terminal of the shunt regulator 11A is connected to the output line of the second power supply voltage. The output terminal of the main control unit 2 is a terminal which outputs a pulse signal, and the voltage when its output is H is VA, for example 3.3 V. The shunt regulator 11A is a circuit component which adjusts the electrical current which flows in some interior control element so that the voltage which is inputted at its detection voltage input terminal is equal to a voltage value which is determined in advance, and it is a circuit component which, along with increase of the load which is connected to the output line for the second power supply voltage (i.e. along with reduction of the voltage which is inputted at its detection voltage input terminal), reduces the electrical current flowing in this interior control element (i.e. increases the electrical current which flows in the load side).

Moreover, as shown in FIG. 2, the power supply 11 comprises a constant voltage circuit 12 which is provided in parallel with the output line for the second power supply voltage. As shown in the figure, this constant voltage circuit 12 is a circuit which uses Zener diodes ZD1 and ZD2 and a transistor TR. The output line of this constant voltage circuit 12 is a power supply line for a video amp or the like not shown in the figures. With the optical disk device 1 of this embodiment, when the load which is connected to the output line of the power supply 11 for the second power supply voltage has dropped due to stoppage of the drive unit or the like, it is possible to suppress heat generation in a resistor R4 which is connected in parallel with the Zener diode ZD1 of the constant voltage circuit 12.

It should be understood that P-ON shown in FIG. 2 is a voltage which causes the Zener diode ZD2 to break down, and it is applied when the main power supply is ON.

In the following, the operation of this optical disk device 1 which is an embodiment of the present invention will be explained.

First, the operation of this optical disk device 1 in the replay mode, in which it replays data which is recorded upon the optical disk 15, will be explained. The optical disk device 1 rotates the optical disk 15 with the spindle motor 4. At this time, the optical disk device 1 performs rotational speed control, in which it controls the rotational speed of the spindle motor 4 so as, for example, Constant Linear Velocity. Furthermore, the optical disk device 1 drives the objective lens of the PU 3 with its actuator in the focus direction, and thereby performs focus control so as to make the position of condensation of the laser light which the PU 3 irradiates upon the optical disk 15 match the recording surface of the optical disk 15. Furthermore, the optical disk device 1 drives the objective lens of the PU 3 with its actuator in the tracking direction, and thereby performs tracking control so as to make the laser light which the PU 3 irradiates upon the optical disk 15 match the center of the track upon the optical disk 15 on which the data being read is recorded. During this tracking control, according to requirements, the PU 3 may also be driven in the tracking direction with its thread motor. The optical disk device 1 uses the second power supply voltage which is outputted from the power supply 11 for driving the various drive units, such as the spindle motor 4, the actuator upon which the objective lens of the PU 3 is mounted, the thread motor, and so on.

It should be understood that this optical disk device 1 may be made so as also to perform tilt control, so as to keep the laser light which is being irradiated from the PU 3 approximately vertical with respect to the recording surface of the optical disk 15. Description relating to tilt control will here be curtailed; it will only be the that, in the case of a drive unit in which the PU 3 is tilted according to such tilt control, this is also driven by using the second power supply voltage outputted from the power supply 11.

The optical disk device 1 creates an RF signal, which corresponds to the total of the signals detected and outputted by the various regions of the PD of the PU 3 representing the amounts of light reflected from the optical disk 15, and inputs this RF signal to the decoder 6. And the decoder 6 extracts from this RF signal the data which is recorded upon the optical disk 15. The data extracted by the decoder 6 is a program stream in which video data and audio data are packetized in predetermined units. The decoder 6 separates this program stream into video data and audio data. And, after separation, the decoder 6 decodes both the video data and the audio data, and then inputs the decoded video data and audio data to the output unit 7. The output unit 7, along with outputting a replay video signal based upon the video data inputted from the decoder 6, also outputs a replay audio signal based upon the audio data. The replay video signal and the replay audio signal are inputted to a display device and to a speaker which are connected to the output unit 7, so that, along with displaying the video upon this display device, the audio is outputted via the speaker.

Furthermore, in its replay mode in which it is replaying data recorded upon the optical disk 15, this optical disk device performs servo control to drive the various drive units such as the above described spindle motor 4, the actuator which supports the objective lens of the PU 3, the thread motor, and so on. In concrete terms, in addition to the RF signal described above, the signal processing section 5 also generates the wobble signal, the FE signal, and the TE signal from the amounts of reflected light from the various regions of the PD of the PU 3 which are detected by the PD. The driver 8 performs rotational speed control and controls the rotational speed of the spindle motor so that the frequency of the wobble signal becomes a frequency which is determined in advance. Moreover, the driver 8 performs focus control based upon the FE signal, and controls the driving of the objective lens of the PU 3 with its actuator in the focus direction, so as to make the condensation position of the laser light emitted by the LD of the PU 3 and the recording surface of the optical disk 15 coincide with one another. Yet further, the driver 8 performs tracking control based upon the TE signal, and controls the driving of the PU 3 in the tracking direction by the thread motor, or of the objective lens of the PU 3 in the tracking direction by its actuator, so that the laser light which is emitted from the LD of the PU 3 is positioned in the center of the track from which data is being read.

And, in the replay mode, logic processing is performed by the main control unit 2 for controlling the operation of the various sections. In this optical disk device, the first power supply voltage is used by the main control unit 2 for performing this logic processing and so on.

On the other hand, in the stopped mode in which replaying of the data recorded upon the optical disk 15 is not performed, this optical disk device 1 does not drive the various drive units, such as the spindle motor 4, the actuator upon which the objective lens of the PU 3 is mounted, the thread motor, and so on. Here, by the stopped mode, is meant the state when, although the power supply for the main part of the optical disk device 1 is still ON, replaying of the data which is recorded upon the optical disk 15 is not being performed. The main control unit 2 still performs logic processing for controlling the operation of the various sections of the optical disk device 1, even in this stopped mode.

Since, in this manner, the drive units are not driven in the stopped mode, accordingly, although the load which is connected to the output line for the second power supply voltage becomes much less than in the replay mode, the load imposed by the logic processing almost does not change. The voltage which is voltage divided by the resistors R1 and R2, and which is inputted to the detection voltage input terminal of the shunt regulator 11A, is approximately equal in both of these modes, the replay mode and the stopped mode.

Figure 3A:
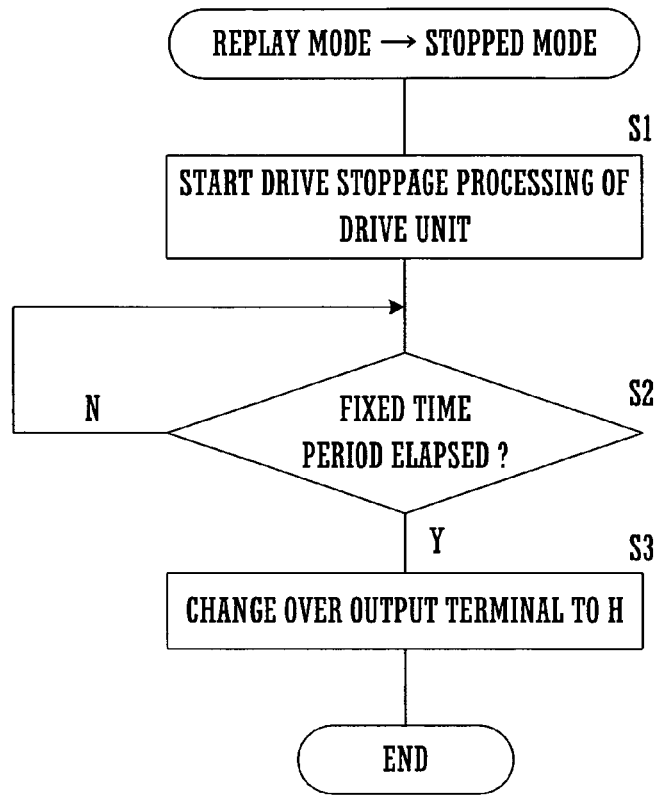
FIGS. 3A and 3B are flow charts showing, in this optical disk device which is an embodiment of the present invention, the flow of processing for transition from the replay mode to the stopped mode, and the flow of processing for transition from the stopped mode to the replay mode.
Figure 3B:
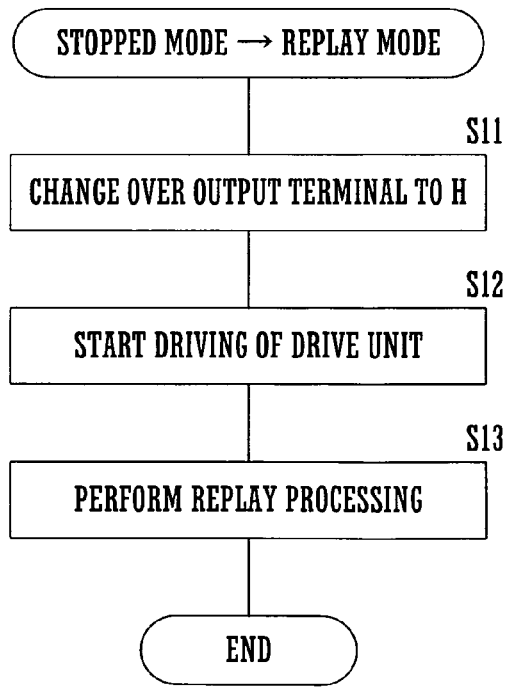

Now, the operation of this optical disk device 1 during the transition from the replay mode to the stopped mode, and during the transition from the stopped mode to the replay mode, will be explained. FIG. 3A is a flow chart showing the processing during the transition from the replay mode to the stopped mode, and FIG. 3B is a flow chart showing the processing during the transition from the stopped mode to the replay mode. First, the processing during the transition from the replay mode to the stopped mode will be explained. In the replay mode, the main control unit 2 of the optical disk device 1 brings the output terminal which is connected to the detection voltage input terminal of the shunt regulator 11A via the resistor R3 to L level. The optical disk device 1 transits from the replay mode to the stopped mode when input actuation for stopping replay is performed, or when the program which is recorded upon the optical disk 15 has been replayed all the way to its end.

First, the optical disk device 1 starts the processing for stopping the various drive units such as the spindle motor 4, the actuator which supports the objective lens of the PU 3, the thread motor, and so on (step S1). The main control unit 2 waits until a fixed time period which is determined in advance, for example 1 to 2 seconds, has elapsed from the time point at which the processing in the step S1 started (step S2). And, when the main control unit 2 has decided in the step S2 that this fixed time period has elapsed, then it changes over the output terminal which is connected to the detection voltage input terminal of the shunt regulator 11A via the resistor R3 from L level to H level (step S3), and then this processing terminates.

Next, the processing during the transition from the stopped mode to the replay mode will be explained. As described above, during the stopped mode, the main control unit 2 of the optical disk device 1 brings the output terminal which is connected to the detection voltage input terminal of the shunt regulator 11A via the resistor R3 to H level. The optical disk device 1 transits from the stopped mode to the replay mode when input actuation for starting replay is performed. And the main control unit 2 changes over the output terminal which is connected to the detection voltage input terminal of the shunt regulator 11A via the resistor R3 from H level to L level (step S11). The processing of this step S11 is performed immediately when input actuation for starting replay is performed; the system does not wait until any fixed time period has elapsed. And the optical disk device 1 starts driving the various drive units, such as the spindle motor 4, the actuator upon which the objective lens of the PU 3 is mounted, the thread motor, and so on (step S12), and thereafter performs replay processing (step S13).

Thus, with the optical disk device 1 of this embodiment, in the stopped mode, the main control unit 2 applies a voltage to the detection voltage input terminal of the shunt regulator 11A. In the replay mode, the main control unit stops applying this voltage to the detection voltage input terminal of the shunt regulator 11A. In other words, in the stopped mode when the load which is connected to the output line for the second power supply voltage becomes smaller, the voltage which is applied to the detection voltage input terminal of the shunt regulator 11A becomes higher than just the voltage which is applied by the main control unit 2. Accordingly, in the stopped mode, the shunt regulator 11A reduces the electrical current which flows in the second power supply voltage output line (i.e., increases the electrical current which flows in the interior of the shunt regulator) according to the voltage which is applied by the main control unit 2. Since, by doing this, the voltage of the output line for the second power supply voltage is reduced, accordingly it is possible to prevent the generation of heat in the stopped mode by the circuit components which are connected to that output line for the second power supply voltage, such as the resistor R4 of the constant voltage circuit 12 and so on.

Furthermore, since the structure is such that the main control unit 2 changes over whether or not it performs application of voltage to the detection voltage input terminal of the shunt regulator 11A, accordingly it is possible to handle this matter by changing with the processing program of the main control unit 2, and this does not invite any large scale change of the main part of the device. Furthermore, it is possible to anticipate a reduction in the cost of the main part of the optical disk device 1, since it is not necessary to employ circuit components of high cost which are highly rated from the point of view of heat generation.

Moreover since it is arranged, during the transition from the replay mode to the stopped mode, to take as a reference the timing of starting the processing for stopping driving the drive units, and to start the application of voltage to the detection voltage input terminal of the shunt regulator 11A after a fixed time period has elapsed, accordingly it is possible to stop the drive units safely, and there is no decrease in the reliability. Furthermore since, during the transition from the stopped mode to the replay mode, the application of voltage to the detection voltage input terminal of the shunt regulator 11A by the main control unit 2 is stopped immediately, accordingly it is possible to commence replay rapidly, and thus there is no decrease of operability by the user.

It should be understood that the present invention may also be applied to an optical disk device which is endowed with a recorder function of recording data upon the optical disk 15, or the like.

It should be understood that, in the above explanation of an embodiment, all of the features are cited by way of example, and are not to be considered as being limitative of the present invention. The range of the present invention is not defined by any of the features of the embodiment described above, but only by the scope of the appended Claims. Moreover, it is intended that the range of the present invention should include all equivalents and variations within the scope of the Claims.

What is claimed is:

1. An optical disk device, comprising:
    a replay unit which reads and replays data recorded upon an optical disk;
    a power supply unit, comprising a transformer, which outputs a first power supply voltage which is used for logic processing and a second power supply voltage which is used for driving a drive unit;

a voltage control unit, comprising a shunt regulator to a detection voltage input terminal of which is connected a voltage which has been voltage divided from the first power supply voltage, and which controls the second power supply voltage to a predetermined voltage value; and a voltage application control unit which applies a voltage which is determined in advance to the detection voltage input terminal of the shunt regulator, when the replay unit is in a stopped mode where replay by the replay unit of data recorded upon the optical disk is stopped.

2. The optical disk device according to claim 1, wherein the voltage application control unit takes as a reference the timing of the changeover from the replay mode, in which the replay unit is replaying data recorded upon the optical disk, to the stopped mode, and applies the voltage which is determined in advance to the detection voltage input terminal of the shunt regulator, after a fixed time period has elapsed.

3. The optical disk device according to claim 2, wherein the voltage application control unit stops applying the voltage which is determined in advance to the detection voltage input terminal of the shunt regulator, when a command has been issued for changeover from the stopped mode to the replay mode.

4. The optical disk device according to claim 3, wherein the voltage application control unit is included in a microcomputer which controls the operation of various sections thereof.

* * * * *